United States Patent Office 3,248,404
Patented Apr. 26, 1966

3,248,404
NOVEL EPOXIDATION PROCESS
Bruno Werdelmann, Dusseldorf, and Gerhard Dieckelmann, Dusseldorf-Holthausen, Germany, assignors to Dehydag Deutsche Hydriewerke G.m.b.H., Dusseldorf, Germany, a corporation of Germany
No Drawing. Filed Aug. 6, 1963, Ser. No. 300,174
Claims priority, application Germany, Aug. 11, 1962, D 39,607
5 Claims. (Cl. 260—348.5)

The invention relates to a novel process for the preparation of epoxidized organic compounds from olefinically unsaturated organic compounds with hydrogen peroxide and a carboxylic acid in a more economical fashion than prior art methods.

Th epoxidation of olefinically unsaturated organic compounds with mixtures of hydrogen peroxide and acids selected from the group consisting of organic mono and polycarboxylic acids and polyoxy compounds containing carboxyl groups is known. Strong mineral acids, such as sulfuric acid and phosphoric acid, ion exchange resins containing sulfonic acid groups and simple aromatic sulfonic acids have been used as catalysts or activating assistants for the epoxidation reaction. However, the degree of epoxidation and the yield of the epoxidized products has been low in all the prior art processes, probably because of the concurrently occurring decomposition of hydrogen peroxide and of the apparent loss of active oxygen to the reaction.

It is an object of the invention to provide a novel process for the preparation of epoxidized organic compounds having an increased degree of epoxidation.

It is another object of the invention to provide a novel process for the preparation of epoxidized organic compounds in a simple, economical manner.

It is a further object of the invention to provide epoxidized organic compounds having a high degree of epoxidation.

These and other objects and advantages of the invention will become obvious from the following detailed description.

The process of the invention for the preparation of epoxidized organic compounds comprises reacting at a temperature of 0 to 100° C., preferably 50 to 75° C., an olefinically unsaturated organic compound with hydrogen peroxide and an oxygen transfer agent selected from the group consisting of mono- and disaccharides and a carboxyl containing compound in the presence of sequestering agents having acid complex forming properties, at least one mol of hydrogen peroxide being present per mol of olefinic unsaturation, to form the epoxidized organic compound and recovering the latter.

The process of the invention has shorter reaction times, requires smaller amounts of epoxidation agents and gives products having a higher degree of epoxidation as compared to the prior art processes using known activators. Moreover, despite the increased acceleration of the reaction in the process of the invention, the thermal control of the reaction mixture is easier which is of considerable importance and safety on a commercial scale.

The olefinically unsaturated compounds capable of being epoxidized are well known and may be aliphatic, cycloaliphatic or heterocyclic compounds having 1 or more olefinic double bonds.

Examples of suitable unsaturated starting compounds for the process are olefinic hydrocarbons, such as pentene, octene, dodecene, octadecene, squalene, etc.; high molecular weight polymers which still contain a plurality of double bonds and preferably have an average molecular weight of 250–300,000, such as polybutadiene or copolymers of butadiene-acrylonitrile, isoprene-isobutylene, cyclopentadiene-methylstyrene-styrol; and derivatives of unsaturated high molecular weight alcohols such as esters of alcohols obtained by controlled reduction of naturally occurring vegetable acids to mantain the double bond, esters of unsaturated alcohols which have been obtained by cleavage of natural wax esters such as esters of unsaturated fatty alcohols with 14 to 26 carbon atoms in the molecule, especially of oleyl alcohol or other simple or polyunsaturated alcohols with any desired low molecular weight or high molecular weight carboxylic acid.

Also suitable are the corresponding ethers of unsaturated alcohols with preferably low molecular weight alcohols. In addition, derivatives of unsaturated high molecular weight fatty acids, such as their esters or amides, wherein the esterification or amidation components may also contain double bonds are also useful. Especially suitable are the naturally occurring glycerides whose fatty acid component may be mono-or polyunsaturated, such as semidry oils, particularly soybean oil, cottonseed oil and aquatic animal oils. Examples of esterification alcohols for the unsaturated fatty acids are mono alcohols such as ethanol, isopropanol, n-butanol, tert.-butanol, tert.-amyl alcohol, octanol, 2-ethyl hexanol, dodecyl alcohol, octadecyl alcohol, cyclohexanol, methylcyclohexanol, naphthenyl alcohol and benzyl alcohol; polyvalent alcohols such as ethyleneglycol, 1,2-propyleneglycol, 2-ethylenehexanediol-1,3, butane diol-1,3,butane diol-1,4, dodecane- diol-1,2, glycerin, pentarythrite; and polyalkylene glycols such as diethylene glycol.

Esters of mixtures of unsaturated carboxylic acids and alcohol may also be used as starting compounds as well as mixed esters of polyvalent alcohols with different unsaturated carboxylic acids such as the mixed esters of ethylene glycol with oleic acid and linoleic acid. Finally, those esters in which the acid moiety as well as the alcohol moiety contain a mono- or polyunsaturated hydrocarbon radical are also useful. In addition to the esters, amides of unsaturated fatty acids may also be used as starting materials such as the amidation products of unsaturated fatty acids or mixtures of fatty acids with ammonia or amines such as dimethylamine, oleylamine, ethylenediamine, cyclohexylamine and benzoylamine.

Examples of other suitable starting materials for the process are tetrahydrobenzoic acid and tetrahydrophthalic acid derivatives or condensation products according to Diels/Alder of diene components with at least two conjugated double bonds and at least one multiple bond. This class of componds includes also the acetals of tetrahydrobenzaldehyde, where the acetalization components may be unsaturated alcohols such as oleyl alcohol, bifunctional alcohols such as decanediol or alcohols with more than two hydroxyl groups such as glycerin. Suitable alcohol components are also those which themselves have been obtained by the Diels/Alder process and possess the tetrahydrocyclo hexane ring. In addition to these starting materials, the esters and ethers of tetrahydrocyclohexyl alcohol or its derivatives may also be used for the epoxidation.

The carboxyl containing compounds mono- and disaccharides which are used in the epoxidation reaction are well known and they act as oxygen transfer agents almost exclusively through a peracid stage. Examples of suitable carboxyl containing compounds are aliphatic monocarboxylic acids such as formic acid, acetic acid, chloroacetic acid, propionic acid, etc.; aromatic monocarboxylic acids such as benzoic acid and its halogenated derivatives; polycarboxylic acids such as succinic acid, adipic acid, citric acid, etc.; and mono- and disaccharides and their mixtures with di- or polycarboxylic acids.

The hydrogen peroxide used should be at least 30%, preferably 50 to 60%, hydrogen peroxide. The amount of hydrogen peroxide used is preferably between 1.0 and 2.0 mols per mol of olefinic unsaturation in the compound to be epoxidized although an excess of hydrogen peroxide may be used if desired. The hydrogen peroxide is as a rule added to the reaction mixture over a period of time such as several hours.

The catalysts or activators for the process are sequestering agents having acid complex forming properties and are preferably incorporated into the hydrogen peroxide before the addition of carboxyl containing compounds which act as oxygen transfer agents. Examples of sequestering agents having acid complex forming properties are lower alkylene diamine polycarboxylic acids such as ethylenediaminetetraacetic acid, N-hydroxyethyl ethylenediaminetriacetic acid, etc.; nitrilotriacetic acid; sulfosalicylic acid; and acylation products of phosphorus acid. A particularly preferred sequestering agent having acid complex forming properties is 1-oxyethane-1,1-diphosphonic acid because particularly high degrees of epoxidation can be obtained with the said reagent in relatively short reaction times with a substantial reduction in the amount of epoxidation agents. The amount of sequestering agents having acid complex forming properties and the carboxyl containing compound is preferably 3 to 15% by weight of the olefinically unsaturated compound.

The order of addition of the reactants may be made in known ways. For example, the olefinically unsaturated compound in admixture with a carboxyl containing compound is reacted slowly with a stream of a mixture of the calculated amount of hydrogen peroxide and the sequestering agents having acid complex forming properties accompanied with vigorous stirring or the process may be performed by adding the carboxyl containing compound and the mixture of hydrogen peroxide and sequestering agents having acid complex forming properties separately with stirring. Also, if a polysaccharide related to sugar is the carboxyl containing compound, a mixture of the disaccharide and the sequestering agents having acid complex forming properties may be formed to effect a partial degradation of the disaccharide and then adding the said mixture and the hydrogen peroxide to the olefinically unsaturated compound.

The reaction may also be effected by using the countercurrent stream distribution principle. In this method a packed column or a similar device for fine distribution of immiscible phases is used, and the material with the lower specific gravity is introduced from the bottom, the hydrogen peroxide with the complex-former is introduced at the top of the column, and in the upper third of the column the liquid carboxyl containing compound (such as propionic acid, adipic acid, glucose, or the like) or the transfer agent dissolved in an inert solvent is introduced.

When the reaction is complete, the water-soluble acid components of the reaction mixture, which may contain minor amounts of unreacted hydrogen peroxide may be separated by known methods and used again in a preliminary step or reaction with an olefinically unsaturated compound.

The high molecular weight epoxy compounds obtainable by the process of the invention are of manifold commercial interest. For instance, they are important assistants as such or in the form of their derivatives as softeners and stabilizers for polyvinyl glyceride and its copolymers because of their compatibility therewith and resistance to migration. Furthermore, the epoxidized compounds may be used as lubricating agents, lubricating oil additives or as fatty components in textile oils. The epoxide compounds which contain more than one epoxide group in the molecule may be used with advantage as starting materials and as additives in the production of synthetic resins and adhesives.

In the following examples there are described several preferred embodiments to illustrate the invention. However, it should be understood that the invention is not intended to be limited to the specific embodiments.

EXAMPLE I 960 parts by weight of soybean oil (acid number=0.05; saponification number=196.0; iodine number=126.0) and 48 parts by weight of adipic acid were introduced into a stirring vessel made of stainless steel (VA) provided with a heating and cooling coil. After the contents of the vessel were heated to a temperature of 65° C., 550 parts by weight of a 50% by weight hydrogen peroxide solution to which 10 parts by weight of 1-oxyethane-1,1-diphosphonic acid had been added were introduced over a period of 2–3 hours with stirring while maintaining the temperature at 65° C. by cooling. The reaction mixture was kept at 65° C. for 24 hours and a sample of the reaction product was taken every two hours. After settling of the raw epoxide, the aqueous acid components were drawn off and the oil was treated twice with the same amount of condenser water and was washed with dilute sodium hydroxide until neutral to remove the residual acid components. After heating the product to 70–80° C. under reduced pressure, a dry soybean oil epoxide oxygen content of 5.10% (iodine number=30.9; acid number=0) was obtained and was called product A.

The above described epoxidation reaction was repeated with the exception that 20 parts by weight of concentrated phosphoric acid instead of 10 parts by weight of 1-oxyethane-1,1-diphosphonic acid were mixed with the hydrogen peroxide. A soybean oil epoxide with an epoxide oxygen content of 4.37% (iodine number= 41.9; acid number=0) was obtained and was called product B.

The improved results of the reaction effected by the addition of the complex former of the invention as compared to phosphoric acid of the prior art is shown in Table I by the differences in the increase in epoxide oxygen content and the decrease of the iodine number for products A and B.

*Table I*

| Reaction time/hours | Increase of epoxide oxygen content | | Decrease of iodine No. | |
|---|---|---|---|---|
| | A | B | A | B |
| 2 | 0.79 | 0.72 | 115.0 | 115.0 |
| 4 | 1.59 | 1.41 | 101.0 | 103.1 |
| 6 | 2.29 | 2.06 | 89.0 | 92.0 |
| 12 | 3.90 | 3.46 | 57.8 | 66.0 |
| 18 | 4.67 | 4.04 | 40.6 | 53.7 |
| 24 | 5.10 | 4.37 | 30.9 | 46.8 |

EXAMPLE II 1000 parts by weight of a bleached and de-acidified soybean oil (acid No.=0; sponification No.=192.5; iodine No.=129.0) were admixed with 80 parts by weight of cane sugar and the mixture was heated to a temperature of 65° C. Thereafter, 550 parts by weight of a 60% by volume hydrogen peroxide solution, to which 10 parts by weight of 1-oxyethane-1,1-diphosphonic acid had previously been added, were added over a period of 3–4 hours while carefully maintaining the temperature of 65° C. The reaction mixture was then stirred for about 22 hours at 65° C. while taking a sample every hour. After cooling, the raw epoxide oil was washed twice with the same amount of condenser water, freed from acid by washing with dilute sodium hydroxide, and then dried under reduced pressure. A light yellow soybean oil epoxide with an epoxide oxygen content of 6.40% (iodine No.=4.6; acid No.=0) was obtained as product C. A color measurement according to Lovisbond results in values of yellow=3.0 and red=0.3 (5¼ inch dish).

The above described epoxidation reaction was repeated with the exception that the complex former was replaced by 20 parts by weight of concentrated phosphoric acid.

A soybean oil epoxide with an epoxide oxygen content of 6.14% (iodine No.=6.5; acid No.=0.1) was obtained as product D. Table II shows the improved results of the invention as compared to the prior art by the difference in the increase in epoxide oxygen content and decrease of the iodine number as the reaction progressed.

*Table II*

| Reaction time/hours | Increase of epoxide oxygen content | | Decrease of iodine No. | |
|---|---|---|---|---|
| | C | D | C | D |
| 2 | 0.35 | 0.34 | 121.0 | 124.0 |
| 4 | 1.69 | 1.47 | 99.0 | 102.0 |
| 8 | 4.82 | 4.25 | 39.6 | 50.6 |
| 16 | 6.16 | 6.13 | 8.5 | 9.6 |
| 22 | 6.40 | 6.14 | 4.6 | 6.5 |

EXAMPLE III

A further improvement of the epoxide reaction was achieved by using a mixture of cane sugar and adipic acid instead of the cane sugar of Example II as the oxygen transfer agent. 1000 parts by weight of soybean oil (acid No.=0; saponification No.=192; iodine No.=129.0) were admixed with 25 parts by weight of cane sugar and 45 parts by weight of adipic acid, and the mixture was heated to a temperature of 65° C. Thereafter, 550 parts by weight of a 60% by volume hydrogen peroxide solution, to which 10 parts by weight of 1-oxyethane-1,1-diphosphonic acid had previously been added, were added over a period of 3–4 hours at the same temperature. After a reaction period of only 7½ hours, a light yellow soybean oil epoxide with an epoxide oxygen content of 6.0% and an iodine No. of 3.0 was obtained.

EXAMPLE IV

Using the procedure of Example I, a mixture of 960 parts by weight of soybean oil (acid No.=0; iodine No.=126.5), 3.93 parts by weight of formic acid was treated with 360 parts by weight of 60% by volume hydrogen peroxide and 17 parts by weight of 1-oxyethane-1,1-diphosphonic acid. A soybean oil epoxide with an epoxide oxygen content of 3.87% and an iodine No. of 58.3 was obtained as product E.

Repeating the epoxidation reaction with 960 parts by weight of soybean oil, 4.14 parts by weight of formic acid and 360 parts by weight of 60% by volume hydrogen peroxide in the presence of 17 parts by weight of concentrated phosphoric acid gave a soybean oil epoxide with an epoxide oxygen content of 3.74% and an iodine No. of 61.5 (product F). Table III shows the advantages of the invention by the difference in the increase in epoxide oxygen content and the decrease in the iodine number during the course of the reaction.

*Table III*

| Reaction time/hours | Product E | | Product F | |
|---|---|---|---|---|
| | Epoxide oxygen content | Iodine No. | Epoxide oxygen content | Iodine No. |
| 2 | 2.06 | 91.0 | 1.43 | 103.5 |
| 4 | 2.84 | 78.5 | 2.32 | 88.0 |
| 8 | 3.48 | 66.5 | 3.24 | 71.0 |
| 10 | 3.64 | 64.5 | 3.47 | 66.5 |
| 12 | 3.69 | 62.0 | 3.54 | 64.8 |
| 14 | 3.82 | 59.5 | 3.65 | 63.0 |
| 20 | 3.87 | 58.3 | 3.74 | 61.5 |

EXAMPLE V

The procedure of Example I was repeated with 950 parts by weight of soybean oil, 370 parts by weight of a 60% by volume hydrogen peroxide solution, 54 parts by weight of pure acetic acid (0.2 mol per mol of olefinic double bond) and 18 parts by weight of 1-oxyethane-1,1-diphosphonic acid to obtain a soybean oil epoxide with 5.78% epoxide oxygen. The course of the reaction is shown in Table IV by the increase in the epoxide oxygen content and the decrease in the iodine number.

*Table IV*

| Reaction time | Epoxide oxygen content | Iodine No. |
|---|---|---|
| 2 | 2.81 | 78.5 |
| 4 | 3.92 | 56.7 |
| 8 | 5.04 | 32.0 |
| 12 | 5.65 | 18.0 |
| 16 | 5.78 | 11.5 |
| 18 | 5.78 | 9.1 |
| 24 | 5.78 | 4.2 |

EXAMPLE VI

One portion of oleyl alcohol prepared synthetically by high pressure hydrogenation of oleic acid was esterified with benzoic acid and another portion was esterified with butyric acid. The oleylbenzoate, purified by distillation, had the characteristic values: acid No.=0.2, saponification No.=148.7, hydroxyl No.=5.2, iodine No.=75.8 and the oleylbutyrate had the characteristic values: acid No.=0, saponification No.=165.7, hydroxyl No.=0, iodine No.=83.8. Each of the products were epoxidized in a manner corresponding to Example II, once in the presence of 1-oxyethane-1,1-diphosphonic acid and once in the presence of phosphoric acid. The amounts of starting material as well as the results obtained thereby are shown in Table V. As shown by Table V, the consumption of hydrogen peroxide and cane sugar is noticeably reduced with a simultaneous increase in quantity of the epoxidation product by using 1-oxyethane-1,1-diphosphonic acid as compared to the prior art phosphoric acid.

*Table V*

| | | | | |
|---|---|---|---|---|
| 1-oxyethane-1,1-diphosphonic acid, gm | 3.00 | -------- | 3.00 | -------- |
| Phosphoric acid, gm | -------- | 7.50 | -------- | 7.50 |
| Oleylbenzoate, gm | 565.00 | 565.00 | -------- | -------- |
| Oleylbutyrate, gm | -------- | -------- | 500.00 | 500.00 |
| Hydrogen peroxide 50% by weight, gm | 165.00 | 350.00 | 180.00 | 350.00 |
| Cane sugar, gm | 24.00 | 35.00 | 26.00 | 35.00 |
| Reaction temperature, °C | 60 | 60 | 60 | 60 |
| Acid No. of the epoxides | 0.10 | 0.60 | 0 | 0.50 |
| Iodine No. of the epoxides | 5.00 | 11.10 | 6.60 | 9.20 |
| Epoxide oxygen content, percent | 3.68 | 3.39 | 3.60 | 3.6 |

EXAMPLE VII 100 parts by weight of a polybutadiene having an average molecular weight of 3,000 were dissolved in 200 cc. of benzene. The solution was admixed with 10 parts by weight of cane sugar and the mixture was raised to a temperature of 70° C. Thereafter, 125 parts by weight of a 60% by volume hydrogen peroxide solution, to which 1.5 parts by weight of 1-oxyethane-1,1-diphosphonic acid had been added, were added over a period of a half hour and the mixture was stirred for six additional hours at 70° C. After working up the reaction mixture, a polybutadiene epoxide with an acid No. of 2.1 and an epoxide oxygen content of 3.8% was obtained.

EXAMPLE VIII 100 parts by weight of soybean oil (acid No.=0.2; saponification No.=190.0; iodine No.=126.5) were admixed with 7 parts by weight of cane sugar and the mixture was raised to a temperature of 65° C. 55 parts by weight of a 50% by weight hydrogen peroxide solution containing 1 part by weight of sulfosalicyclic acid were added over a period of one hour, and the reaction mixture was then stirred for about 18 hours at 65° C. After the customary purification procedure, a virtually colorless soybean oil epoxide with an acid No.=0.0; an iodine No.=3.8 and an epoxide oxygen content of 6.2% was obtained.

EXAMPLE IX 90 parts by weight of dodecene (B.P. at 11 mm. Hg=99° C.; iodine No.=144.8) were thoroughly admixed with 5 parts by weight of a technical grade cane sugar, and after adding 1 part by weight of sulfosalicylic acid the mixture was heated to 60° C. 50 parts by weight of a 50% by weight hydrogen peroxide solution were added in small portions over the course of 2 hours, and then the mixture was maintained for a total of 20 hours at 60° C. Analysis of the purified reaction product showed that 27% of the olefin originally used had been transformed into dodecene epoxide. The unreacted dodecene was recovered by fractional distillation and may be used again for epoxidation.

EXAMPLE X 700 parts by weight of the oleyl ester of tetrahydrophthalic acid (acid No. 0.2; saponification No. 159.4; hydroxyl No. 9.7; iodine No. 120.9) were thoroughly admixed with 35 parts by weight of glucose and 6 parts by weight of ethylenediaminetetraacetic acid. 580 parts by weight of a 50% by volume hydrogen peroxide solution were added over the course of two hours at a temperature of 50° C., and after all of the hydrogen peroxide had been added, the mixture was heated to 70° C. and was stirred at this temperature for 15 hours. After the customary purification, a clear oil with an acid No.=0.1; and iodine No.=7.5; a viscosity=480 cp; a boiling point=240° C.; a flash point=295° C.; a solidifying point=−10° C. and an epoxide oxygen content of 6.0% was obtained.

Various modifications of the process and products of the invention may be made without departing from the spirit or scope thereof and it is to be understood that the invention is to be limited only as defined in the appended claims.

We claim:
1. A process for the preparation of epoxidized organic compounds which comprises forming a mixture of 1.0 to 2.0 moles of hydrogen peroxide per mole of olefinic unsaturation in the unsaturated organic reactant and 3 to 15% by weight, based on the unsaturated organic reactant, of a catalyst selected from the group consisting of a lower alkylene diamine polycarboxylic acid, nitrilo-triacetic acid, sulfosalicylic acid and 1-oxyethane-1,1-diphosphonic acid, adding the said mixture stepwise at a temperature from 0 to 100° C. to an olefinically unsaturated organic compound and at least one oxygen transfer agent selected from the group consisting of mono- and disaccharides, lower aliphatic monocarboxylic acids, benzoic acid and its halogenated derivatives, succinic acid, adipic acid and citric acid to form the corresponding epoxidized organic compound and recovering the latter.

2. The process of claim 1 wherein the reaction is effected at 50 to 75° C.

3. The process of claim 1 wherein the catalyst is 1-oxyethane-1,1-diphosphonic acid.

4. The process of claim 1 wherein the oxygen transfer agent is a mixture of cane sugar and adipic acid.

5. A process for the preparation of epoxidized organic compounds which comprises forming a mixture of an olefinically unsaturated organic compound, a disaccharide and 3 to 15% by weight, based on the said organic compound, of a catalyst selected from the group consisting of lower alkylene diamine polycarboxylic acid, nitrilo-triacetic acid, sulfosalicylic acid and 1-oxyethane-1,1-diphoshonic acid, adding stepwise to the said mixture 1.0 to 2.0 moles of hydrogen peroxide per mole of olefinic unsaturation at a temperature from 0 to 100° C. to form the corresponding epoxidized organic compound and recovering the latter.

References Cited by the Examiner

UNITED STATES PATENTS 2,692,271  10/1954  Greenspan et al. ____ 260—348.5
2,992,237  7/1961  Dieckelmann _____ 260—348.5

IRVING MARCUS, *Primary Examiner.*

NICHOLAS S. RIZZO, JOHN D. RANDOLPH, WALTER A. MODANCE, *Examiners.*